(12) United States Patent
Brown et al.

(10) Patent No.: US 12,147,852 B2
(45) Date of Patent: Nov. 19, 2024

(54) COORDINATING AND PROCESSING EVENTS ACROSS MULTIPLE SYSTEM MANAGERS

(71) Applicant: DELL PRODUCTS, LP, Round Rock, TX (US)

(72) Inventors: Michael E. Brown, Austin, TX (US); Rishi Mukherjee, Bangalore (IN); Muniswamy Setty KS, Bangalore (IN); Smruti Ranjan Debata, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 342 days.

(21) Appl. No.: 17/237,847

(22) Filed: Apr. 22, 2021

(65) Prior Publication Data

US 2022/0342726 A1    Oct. 27, 2022

(51) Int. Cl.
  *G06F 9/46*    (2006.01)
  *G06F 9/48*    (2006.01)
  *G06F 9/52*    (2006.01)
  *G06F 9/54*    (2006.01)

(52) U.S. Cl.
  CPC ............ *G06F 9/542* (2013.01); *G06F 9/4812* (2013.01); *G06F 9/52* (2013.01)

(58) Field of Classification Search
  CPC .......... G06F 9/542; G06F 9/4812; G06F 9/52
  See application file for complete search history.

(56) References Cited

U.S. PATENT DOCUMENTS

| | | | |
|---|---|---|---|
| 10,579,575 B2 | 3/2020 | Heracleous et al. | |
| 2012/0130843 A1* | 5/2012 | Himmerick | G06Q 30/08 705/26.3 |
| 2014/0310033 A1* | 10/2014 | Cauvy | G06Q 10/02 705/5 |
| 2017/0230251 A1 | 8/2017 | Dube et al. | |
| 2018/0069748 A1* | 3/2018 | Hu | H04L 12/1822 |
| 2020/0073720 A1 | 3/2020 | Debata et al. | |
| 2021/0090126 A1* | 3/2021 | Schobeiri | G06F 21/6263 |

* cited by examiner

*Primary Examiner* — Tammy E Lee
(74) *Attorney, Agent, or Firm* — Larson Newman, LLP

(57) ABSTRACT

An information handling system includes a console bid manager that may intercept an event from a managed node, transmit notification to eligible management consoles for bids on the event, process the bids to determine one or more interrelated actions in response to the event, and coordinate performance of the one or more interrelated actions in handling the event. The performance of the one or more interrelated actions may be delegated to the eligible management consoles to resolve the event from the managed node.

20 Claims, 4 Drawing Sheets

| Management Console Application/Plugin | Power Control/ Power Policies | Serviceability | Virtual Machine Migration Support | ... | Configuration/ Deployment Support |
|---|---|---|---|---|---|
| Data Center Power Management Console | Y | N | N | | N |
| Server Administration Management Console | N | Y | N | | N |
| Workload Administration Management Console | N | N | N | | Y |
| ... | | | | | |
| Lifecycle Administration Management Console | N | N | Y | | N |

FIG. 4

COORDINATING AND PROCESSING EVENTS ACROSS MULTIPLE SYSTEM MANAGERS

FIELD OF THE DISCLOSURE

The present disclosure generally relates to information handling systems, and more particularly relates to coordinating and processing events across multiple system managers.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a console bid manager that may intercept an event from a managed node, transmit notification to eligible management consoles for bids on the event, process the bids to determine one or more interrelated actions in response to the event, and coordinate performance of the one or more interrelated actions in handling the event. The performance of the one or more interrelated actions may be delegated to the eligible management consoles to resolve the event from the managed node.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4 is an example of a table for coordinating and processing events across multiple system managers, according to an embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
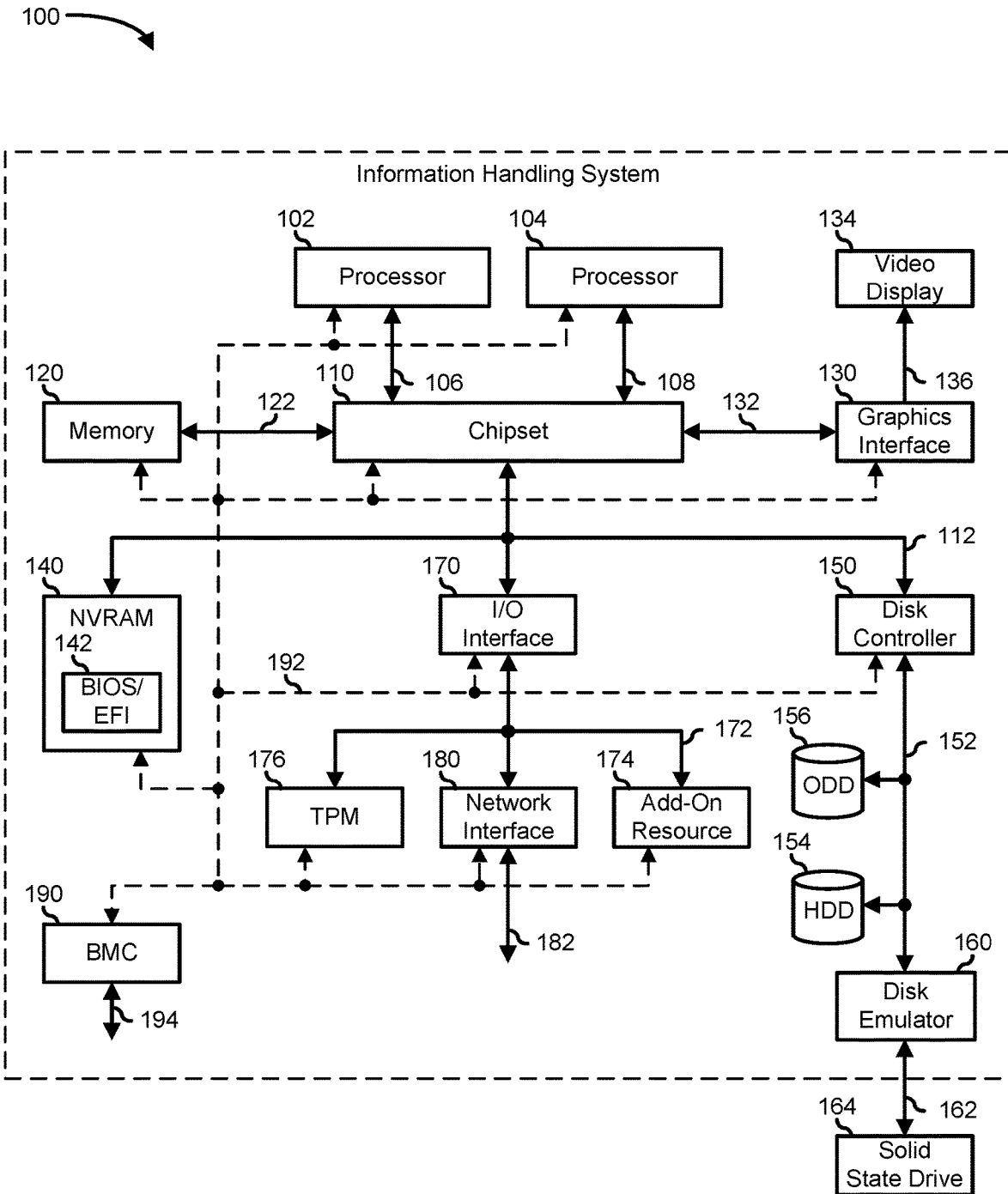
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility. a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

A system manager, also referred to as a management console application, may be used to provide management facilities for information handling systems. An administrator may use a management console application to interface and provide instructions to a management controller. With additional features or capabilities over time, the complexity of a management console application increases. The system manager may be used as an independent management console application or plugin and may be responsible for different granular and incremental functional areas such as configurations, compliances, change management (firmware and driver upgrade), power and thermal monitoring, serviceability, third party console extensions, data mining, etc. of information handling systems.

The granular and incremental functional areas may be decoupled to ease the complexity issues. However, issues may arise in event management and processing with the decoupling because of overlaps across different functional areas. Further, there is typically no standard mechanism across different management consoles to collaborate and coordinate event processing of one or more events. Non-federated functional areas limit the scalability requirements of a data center for the collaborative processing of events within or across one or more geographical areas. An issue may arise in the management of several functional areas and the processing events associated with those functional areas as one or more of these may overlap. To address these and other concerns, the present disclosure provides a system and method for coordinating and processing events across multiple system managers.

Figure 2:
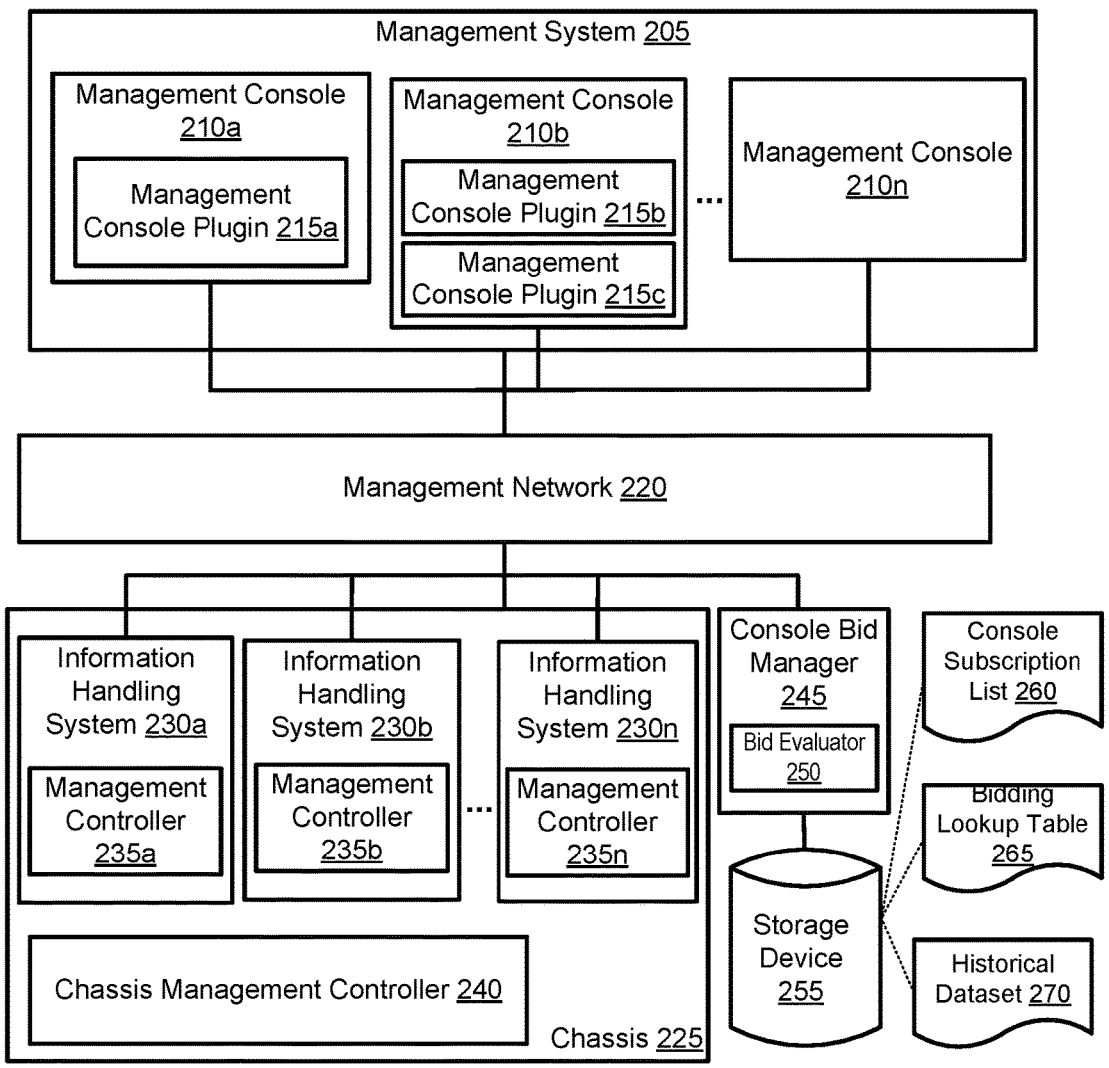
FIG. 2 is a block diagram illustrating an example of a system for coordinating and processing events across multiple system managers, according to an embodiment of the present disclosure.

FIG. 2 shows a system 200 for coordinating and processing events across multiple system managers. System 200 includes a management system 205, a management network 220, a chassis 225, a console bid manager 245, and a storage device 255. Management system 205 includes management consoles 210a-210n. Management console 210a includes a management console plugin 215a. Management console 210b includes management console plugins 215b and 215c. Chassis 225 includes a chassis management controller 240 and information handling systems 230a-230n. Information handling system 230a includes a management controller 235a. Information handling system 230b includes a management controller 235b. Information handling system 230n includes a management controller 235n. Console bid manager 245 may include a bid evaluator 250. The components of system 200 may be implemented in hardware, software, firmware, or any combination thereof. The components shown are not drawn to scale and system 200 may include additional or fewer components. In addition, connections between components may be omitted for descriptive clarity.

Chassis 225 may be configured to house a plurality of servers also referred to as blades or nodes, such as information handling systems 230a-230n which are similar to information handling system 100 of FIG. 1. Information handling systems 230a-230n may be employed by an organization or enterprise for processing, storing, and distributing data. Each of information handling systems 230a-230n includes management controllers 235a-235n respectively which is connected to management network 220 to provide for out-of-band monitoring, management, and control of the elements of information handling systems 230a-230n. Each of management controllers 235a-235n may be similar to BMC 190 of FIG. 1. In addition, chassis management controller 240 may also provide the out-of-band monitoring management and control of the elements of information handling systems 230a-230n and chassis 225. Information handling systems 230a-230n may also be referred to as managed nodes.

Management system 205 broadly represents various functions and features for management and monitoring of chassis 225 and the various elements thereof, such as information handling systems 230a-230n. Management system 205 includes one or more management console applications, which may be used interchangeably with the term "management consoles" or simply "consoles." A management console represents a system that is configured to couple to a management controller and issue management instructions for an information handling system that is being managed by the management controller. In various embodiments, management consoles may be implemented via specialized hardware and/or via software running on an information handling system. In some embodiments, a management controller and management console may be in a 1:1 relationship, such that each console is used to instruct exactly one management controller. In other embodiments, a 1:N arrangement may be used in which there is no such 1:1 correspondence, such that multiple consoles may be used to instruct a single management controller. Management consoles 210a-210n may be communicatively coupled to management controllers 235a-235b and chassis management controller 240 via management network 220. A user or administrator may use one of management consoles 210a-210n to interact with management controllers 235a-235n and chassis management controller 240. For example, management console 210a may be used to display data that has been read from management controller 235a regarding the state of information handling system 230a. Further, management consoles 210a-210n may be used to set values of configuration variables, initiate reboots, install updates, and/or complete any other management task as needed, as will be understood by one of ordinary skill in the art.

For example, management console 210a may be a power management console, management console 210b may be a server management console, and management console 210n may be a workload management console. The power management console permits a data center administrator to monitor and control various functions and features of the data center that are related to power consumption and power management. For example, the power management console can permit the administrator to manage the power of information handling systems 230a-230n. The server management console permits the administrator to monitor and control various functions and features of information handling systems 230a-230n. Workload management console permits the administrator to monitor and control various functions and features that relate to the workloads running on information handling systems 230a-230n. Management system 205 may include more or less than the management consoles 210a-210n. For example, management system 205 can include management consoles for energy management, asset management, availability management, risk management, service management, supply chain management, information technology automation, lifecycle management, or other management functions of a data center, a chassis, an information handling system, and/or its elements as needed or desired.

The present disclosure includes a subscription-based system and method where each management console and/or management console plugin subscribes to a "lead node" referred herein as "console bid manager" such as console bid manager 245. Here, management consoles 210a-210n, management console plugins 215a, 215b, and 215c may be configured to subscribe to notifications of the respective type of events within their functional area. An example embodiment of the subscription is shown below. Although the subscription is shown in an extensible markup language format, the subscription may be in other formats such as in a JavaScript Object Notation (JSON) format.

```
<console>
<id>powermanager</id>
    <subscription-id>1993888FFAA009</subscription-id>
    <events>
        <event id='PWR-3000' message='Power threshold exceed on user defined limit.'
    recommendedAction='Optimize workload for this node, make sure load balancer is
    up and running.' />
        <event id='THR-5000' message='Inlet temperature is rising as per defined threshold.'
    recommendAction='Make sure cooling needs met for this node.'/>
        ........
    </events>
    <notification-policy expr="id==$1" cond="optional" />
        <workorder-weight>1</workorder-weight>  <!-- if workorder enabled in CBM during
        overlapping this has to take 1st priority enum values: 1, 2, 3 [ High to Low ]-->
        .....
        <bid-destination>https://100.12.34.56:7890/runtimestats/bid-data</bid-destination>
        <!-URL for bidding destination if event overlapping found -- >
```

```
<event-destination>https://100.11.22.33:4455/alerts/endpoint</event-destination>
<!--URL for event receiving destination-- >
</console>
```

Console bid manager 245 may be configured to acknowledge receipt of the subscription. The management console may resend the subscription if an acknowledgment is not received within a time limit. The configuration may be parsed and implemented via any standard technique that will be understood by one of ordinary skills in the art. Console subscription list 260 may be generated from the subscriptions received and may include entries with information associated with the management consoles 210a-210n and management console plugins 215a-215c. For example, console subscription list 260 may include a management console or management console plugin unique identifier, its type, functional areas, an event identifier(s) it is subscribing into, work order weight, uniform resource location (URL) associated with the management console or management console plugin, etc.

If there are multiple instances of a management console, such as if there are multiple instances of management console 210a, one of the instances may perform the subscription which applies to the other instances. Management console 210a may notify console bid manager 245 of the other instances and their access information. Thus, the subscription list may include information associated with the other instances of the management consoles or management console plugins. In one embodiment, a management console or management console plugin or an instance thereof may withdraw its subscription by notifying console bid manager 245 of its intention, such as by publishing its unique identifier. If one instance of the management console withdraws the subscription, the other instances may remain as subscribers.

The subscription allows the management console or management console plugin to be notified of an event. Upon receipt of the notification, the management console or management console plugin may submit a bid associated with the event to the console bid manager. As used herein, a "bid" is the cost involved for the management console or management console plugin to process or resolve the event. The bid may also include whether the management console or the management console plugin may want to exclusively handle the event or not. The management console or management console plugin may perform one or more actions to process or resolve the event.

Console bid manager 245 may have static configurations for "backward compatibility," such as if a management console and/or management plugin may not be configured to have active bidding support, that is it cannot generate a bid for an event or subscribe to notifications of console bid manager 245. The static configuration may include information associated with the bidding process such as an event identifier(s), cost or value for the bid associated with each event that the management console or management plugin can resolve or bid, management console or management console plugin identifier, a URL associated with the management console or management console plugin, etc.

Console bid manager 245 may be configured to discover managed nodes in a chassis and/or across the data center and intercept events trigged by managed nodes. Console bid manager 245 may filter which of the events to intercept. For example, console bid manager 245 may intercept obligatory events and ignore non-obligatory events. Console bid manager 245 may also filter an event if there are no management consoles or management console plugins that subscribed to that event. Event filtering may be based on a policy and/or rule. An administrator may be able to add, edit, or delete the policy and/or rule.

When an event is intercepted, console bid manager 245 may solicit and/or receive bids from the management consoles and/or management console plugins. A bid may be based on a weighted value associated with the action indicative of their importance. A critical or disruptive action may be assigned a higher weight value. For example, performing a hot-swap may have a higher weighted value than opening a support ticket. Console bid manager 245 may evaluate the bids received and decide whether to perform one or both of the actions. Based on the weighted values, console bid manager 245 may direct the first management console to perform a hot-swap before directing the second management console to open the support ticket. In another embodiment, console bid manager 245 may not decide to open the support ticket. In yet another embodiment, console bid manager 245 may decide to not perform the hot-swap and just open the support ticket, such as when the management console that will perform the hot-swap is not available.

Console bid manager 245, in particular bid evaluator 250, may be configured to evaluate the bids based on one or more factors or parameters as shown in a bidding lookup table 400 of FIG. 4. For example, one of the factors may be the availability of the management console or management console plugin. The availability of the management console may refer to whether or not the management console is available to perform the action. For example, if the management console or management console plugin may not be available to perform the action if it is under maintenance and thus offline. The factors may also include one or more of the following: current workload running in that functional area, size or number of pending events to be processed and associated wait time, the approximate turnaround time for the action or resolution, assessment of the impact of the action or resolution, other policies such as only healthy management consoles may be used, type of resources of the management console, energy cost of the resolution, etc. The current workload may refer to the utilization of the memory, central processing unit, input/output, etc. The approximate turnaround time may be based on historical static data or predictions and machine learning.

Console bid manager 245 may use one or more mechanisms in evaluating the bids. For example, console bid manager 245 may be configured to use bid evaluation rules which may be stored in storage device 255 to determine how to coordinate one or more actions to resolve or process the event. The bid evaluation rules can include dynamic decision scripts. Additionally, the rules can be updated by an administrator. For example, the administrator can edit, add, or delete a rule. In another example, console bid manager 245 may use a machine learning algorithm in evaluating the bids and/or generate a prediction on how to coordinate the actions to resolve or process the event. A machine learning algorithm such as a random forest, support vector machine, etc. may be used to generate the prediction.

Based on the evaluation, console bid manager 245 may arrive at a decision and delegate the management console or management console plugin to perform an action to resolve the event. If there is more than one action to be performed, then console bid manager 245 may coordinate the actions. The bid evaluation may be performed before delegating the action to resolve the event. In one embodiment, the evaluation may be performed based on the subscription or static configuration associated with the event that is maintained by console bid manager 245. In another embodiment, the evaluation may be performed upon receipt of overlapping bids, such as when more than one management console or management console plugin is eligible to process or resolve the event. If there is only one management console or management console plugin that is subscribed and/or can perform the action to process or resolve the event, console bid manager 245 may not perform an evaluation and just delegate the management console or management console plugin to process or resolve the event.

In evaluating the bids, particularly critical or disruptive actions or operations may be assigned a weight value indicative of their importance. For example, based on the bids from the management consoles and other factors, the actions may be ranked by console bid manager 245 according to the weight values. Based on the rankings, console bid manager 245 may decide to direct the management console to perform one action before or instead of another action. A corrective action or task with a rank of 1 may be performed before an action with a rank of 2. For example, if the action is disruptive, console bid manager 245 may decide not to perform the action or determine a time to perform the action, such as after work hours.

Console bid manager 245 may be configured to allocate scores to management consoles and/or management console plugin with overlapping capabilities and/or features. The management console and/or management console plugin with the highest score may be delegated the action. Console bid manager 245 may be configured to support work order-based processing of events on the above score if an event requires attention from more than one management console. If enabled, console bid manager 245 may delegate the same event in a synchronized order to other management consoles by looking into the bidding attributes of the other management consoles, such as its priority. If two or more management consoles and/or management console plugins have the same score, console bid manager 245 may utilize their bids to decide the order of delegating the actions in processing the event.

Storage device 255 may be a persistent data storage device that includes a solid-state disk, hard disk drive, magnetic tape library, optical disk drive, magneto-optical disk drive, compact disk drive, compact disk arrays disk array controller, and/or any computer-readable medium operable to store data. Storage device 255 may be configured to store one or more information to be used in performing the systems and methods herein. Storage device 255 may store a console subscription list 260, a bidding lookup table 265, and a historical dataset 270. Console subscription list 260 may include information associated with management consoles 210a-210n and management console plugins 215a-215c. For example, the information may include the name, unique management console and/or management console plugin identifier, types and/or unique identifiers of events the management console or management console plugin wants to be notified, etc. Bidding lookup table 265 may include features associated with management consoles 210a-210n and management console plugins 215a-215c. Bidding table 260 may also include the factors or parameters used during bid evaluation. Historical dataset 270 may include past information associated with the bid evaluation and/or processing of events. Historical dataset 270 may be used by console bid manager 245 to train a machine learning algorithm as part of the bid evaluation and/or processing of events. For example, historical dataset 270 may be used to predict the hierarchal classifications of interrelated and/or dependent actions which may be used in coordinating the aforementioned actions.

Those of ordinary skill in the art will appreciate that the configuration, hardware, and/or software components of system 200 depicted in FIG. 2 may vary. For example, the illustrative components within system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
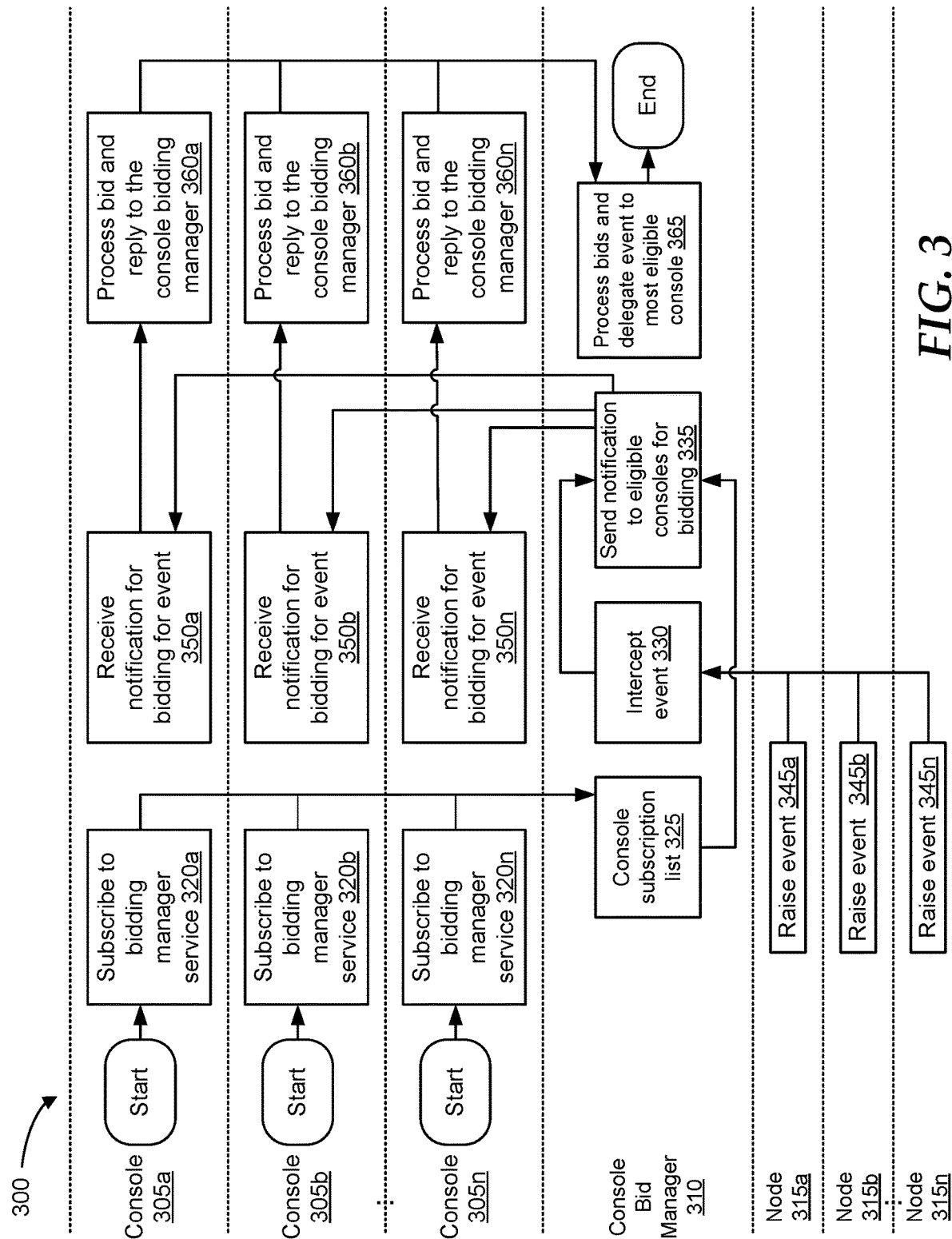
FIG. 3 is a flow diagram illustrating an example of a method for coordinating and processing events across multiple system managers, according to an embodiment of the present disclosure.

FIG. 3 shows a flow diagram of a method 300 for coordinating and processing events across multiple system managers. Aspects of method 300 may be performed by one or more management consoles such as console 305a-305n, a console bid manager 310, and one or more managed nodes such as nodes 315a-315n. While embodiments of the present disclosure are described in terms of system 200 of FIG. 2, it should be recognized that other systems may be utilized to perform the described method. One of skill in the art will appreciate that this flowchart explains a typical example, which can be extended to advanced applications or services in practice.

Consoles 305a-305n may be similar to management consoles 210a-210n. Aspects of method 300 performed by consoles 305a-305n may be performed by a management console plugin similar to management console plugins 215a-215c of FIG. 2. For example, a management console plugin may subscribe, receive notifications, and bid for an event. The management console plugin may also perform an action to resolve the event. If the management console has one or more management console plugins, each of the management console plugin may perform the aforementioned in addition to the management console.

Nodes 315a-315n may be similar to information handling systems 230a-230n of FIG. 2. Console bid manager 310 which is similar to console bid manager 245 of FIG. 2 may be configured to run a console bid manager service that performs aspects of this disclosure such as to proxy and intercept events from one or more managed nodes such as information handling systems 230a-230n of FIG. 2.

When an event is intercepted, eligible management consoles and/or management console plugins may be notified for bidding. Console bid manager 310 may determine which management console and/or management console plugin may be eligible to resolve the event. A management console or a management console plugin may be eligible to process or resolve the event if its subscription includes the event. The management console or a management console plugin may also be eligible if it has functional feature that can resolve the event. The notified management consoles and/or management console plugins may respond to the notification and include a "bid" in the response. Upon receipt of the bids, console bid manager 310 may perform a "bid evaluation"

and may delegate a call for action to one or more of the management consoles and/or management console plugins that participated in the bidding process. In one embodiment, console bid manager 310 may delegate the call for action to the most eligible management console or management console plugin, which is the one with the winning bid(s).

If there is more than one action to process or resolve the event, console bid manager 310 may be configured to determine and coordinate interrelated and/or dependent actions. Further, console bid manager 310 may be configured to decide eligible the management console(s) and/or management console plugin(s) to perform the action(s) to process or resolve the event. The decision may be based on the ranking or priority of the eligible management console(s) and/or management console plugins. For example, a higher ranking management console may be delegated to perform the action instead of a lower-ranking management console. The ranking of the management consoles may be based on the priority of the management consoles.

At blocks 320a-320n, each of consoles 305a-305n may subscribe to console bid manager 310 to receive notification regarding a certain type of events within their functional area. Although not shown, management console plugins may subscribe to console bid manager similar to consoles 305a-305. At block 325, console bid manager 310 may acknowledge the subscription request of consoles 305a-305n and perform a registration process. There may be one registration for each class, type, or management consoles and/or management console plugins with similar capabilities or features. For example, console 305a may be registered once even if it has more than one instance. However, if console 305a has one or more management console plugin, each of the management console plugin may have its own registration. Console bid manager may generate a console subscription list based on the received subscriptions. The console subscription list may include information associated with consoles 305a-305n such as its name, identifier, types of events the console wants to be notified with, etc. After generating the console subscription list, the method proceeds to block 335.

At block 345a-345n, each one of node 315a-315n raises an event that is intercepted at block 330 by console bid manager 310. The events may include system thermal events, hardware operating system events, system failure events, motherboard free fall events, system-off condition events, storage failure events, etc. The events may be ranked in terms of their relative priority, for example with numerical rankings in some given range such as 1-5. For example, an event raised at block 345a may be assigned a rank of 1, indicating that it is a high priority event. The event raised at block 345b may be assigned a rank of 5, indicating that it is low priority event. Console bid manager 310 may process the events according to their ranking. In one embodiment, console bid manager 310 may process the event in real-time to determine which management console and/or management console plugin would want to bid on the event. For example, console bid manager 310 may solicit bids for events in real-time. In another embodiment, console bid manager 310 knows via a pre-configured policy which management console and/or management console plugin handles a particular event. In yet another embodiment, console bid manager 310 may perform both, wherein it first determines if there is a pre-configured policy and if there is no pre-configured policy then solicits for bids. The method proceeds to block 335.

At block 330, console bid manager 310 intercepts an event such as an event associated with blocks 345a-345n. After intercepting the event, the method proceeds to block 335. At block 335, console bid manager 310 may send a notification to the consoles in the console subscription list. For example, console bid manager 310 may send a notification to consoles 305a-305n that the subscription request has been received. In another example, console bid manager 310 may send a notification to consoles 305a-305n that an event has been raised. The notification may include information associated with the event such as an event identifier, type of event, etc. In one example, console bid manager 310 may send a notification for bidding for each event raised in blocks 345a-345n. The events may be similar or different from each other. The method proceeds to block 350a-350n.

At blocks 350a-350n, consoles 305a-305n receive the notification for the raised events. After receiving the notification, the method proceeds to blocks 360a-360n where each of consoles 305a-305n process a bid associated with the received notification and sends a response or reply to console bid manager 310. At block 365, console bid manager 310 processes the bids received from consoles 305a-305n and delegate resolution of the event to the most eligible console. Console bid manager 310 may process the bids based on internal criteria. For example, console bid manager 310 may apply rules to the received bids to determine the most eligible console to resolve the event. In addition, console bid manager 310 may determine the most eligible console to resolve the event based on the historical dataset. Console bid manager 310 may also use a machine-learning algorithm to determine the most eligible console, such as a naive Bayes classifier. After delegating the event, the method ends.

In another embodiment, console bid manager 310 may decide to perform actions from more than one eligible management console. The actions may be interrelated and/or have dependent actions. Console bid manager may coordinate the performance of the interrelated and/or dependent actions accordingly. For example, if a first action is dependent on a second action, wherein the second action is desirable to be performed first before performing the first action, then console bid manager 310 may delegate the second action to a corresponding management console before delegating the first action to the corresponding management console.

In yet another embodiment, console bid manager 310 may receive the first bid from a first management console associated with a first feature, wherein the first bid relates to a first action. The console bid manager may also receive a second bid from a second management console associated with a second feature, wherein the second bid relates to a second action. If it is determined that the first action is the best bid according to the criteria, such that the best bid may be the lowest cost, the highest priority, etc. to resolve the event, then delegating the first management console to perform the first action but not delegate the second management console to perform the second action.

In another embodiment, if it is determined that the first management console is the most eligible to perform an action to resolve the event, such as the second management console is unavailable, etc. delegating the first management console to perform the first action but not the second management console to perform the second action. In yet another embodiment, if it is determined that the first management console has a higher priority than the second management console, then delegating the first management console to perform the first action and not delegate the second management console to perform the second action. If it is determined to perform both the first action and the second action, then determine the hierarchal classification of the first action and the second action, wherein the hierarchal classification may be based on one or more factors associated with the bid such as dependency, availability of the management console to perform the action, the priority of the action, etc. The factors may include but are not limited to the parameters outlined in bidding lookup table 400 of FIG. 4. Console bid manager may coordinate the performance of the first action and the second action based on the determined hierarchal classification. The console manager may not perform the second action if the first action has resolved the event successfully. If there is a tie in the hierarchal classification, a tie-breaker may be implemented which may be based on a particular factor. If there is a new event, the console bid manager may delegate an action to a default management console to perform a default action, wherein the default management console may make a call to the administrator for an unhandled critical event.

FIG. 4 shows an example bidding lookup table 400 which includes factors or parameters that may be used in coordinating and processing events across multiple system managers. Bidding lookup table 400 may include entries associated factors or parameters used in evaluating the bid and/or coordinating the interrelated and/or dependent actions such as features, capabilities, or bid attributes associated with the management consoles and/or management console plugins. For example, a "Y" entry may indicate that the management console has the capability while an "N" may indicate that the management console does not have that capability. Bidding lookup table 400 may be maintained and periodically refreshed based on the addition or removal of one or more subscriptions or refresh with one or more console capability updates.

As shown, the factors may include the ability to control power or power policies, serviceability, virtual machine migration support, or configuration deployment support. Other factors may include a mean time to repair/resolve an event, compute usage per second, whether the management console or management console plugin is local or remote. For example, a local management console may have a higher ranking than a remote management console. Another factor may be historical information such as whether the event occurred previously, which management console resolved the event, how the event was resolved, whether the resolution was successful etc. For example, given a similar event, a management console that successfully resolved the event before may be given a higher ranking than a management console with no history of resolving the event.

One or more of the management consoles in a data center can have overlapping areas of responsibility. In particular, one or more of the management consoles can resolve an event raised by a managed node. For example, a first management console can perform an action to resolve a hard drive failure event such as by performing a hot-swap. A second management console can also resolve the hard drive failure event by opening a support ticket to replace the failed hard drive. The console bid manager may be configured to analyze and decide which of the actions if any, may be most effective in processing and/or resolving the event. In addition, console bid manager 245 may also decide whether all of the actions or a subset thereof may be performed. A bidding data table similar to bidding lookup table 400 may be used in the decision-making process. The console bid manager may be configured to base its decision factors or parameters in the bidding data table. A scoring mechanism may be used to identify a management console with the highest score and thus most eligible. Based on the decision, if there is more than action to be performed, console bid manager 245 may perform a hierarchical classification to determine which of the actions may be performed first. In this example, the console bid manager may decide that the effective course of action may be to perform the hot swap and then open the support ticket.

Although FIG. 3 shows example blocks of method 300 in some implementation, method 300 may include additional blocks, fewer blocks, different blocks, or differently arranged blocks than those depicted in FIG. 3. Additionally, or alternatively, two or more of the blocks of method 300 may be performed in parallel. For example, block 320*a* and block 320*b* of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    intercepting, by a processor, a system failure event triggered by a managed server, wherein the processor hosts a console bid manager for managing bids from management consoles to resolve the system failure event triggered by the managed server, wherein each one of the management consoles is associated with a management controller that manages the managed server;
    transmitting a notification to the management consoles for the bids to resolve the system failure event by performing an action, wherein each one of the bids includes a cost to resolve the system failure event, and wherein the cost includes a central processing unit utilization for resolving the system failure event;
    processing the bids from the management consoles to determine a bid with a lowest cost;
    delegating the performance of the action to the management console with the lowest cost; and
    if there is more than one management console with the lowest cost, then delegating the performance of the action based on ranking of the management console relative to the management consoles.

2. The method of claim 1, determining a dependent action to the action.

3. The method of claim 2, further comprising coordinating performance of the dependent action with one or more interrelated actions.

4. The method of claim 1, generating a console subscription list based on received subscriptions from the management consoles.

5. The method of claim 1, generating a bid lookup table that includes factors for bid evaluation.

6. The method of claim 1, wherein each of the management consoles is configured with a feature to resolve the system failure event.

7. The method of claim 1, wherein the processing of the bids includes analyzing a historical dataset.

8. The method of claim 1, further comprising discovering the managed server.

9. The method of claim 1, further comprising filtering the system failure event if there is no management console subscribed to the system failure event.

10. The method of claim 1, further comprising assigning a score to each of the management consoles.

11. An information handling system, comprising:
    a management controller; and
    a console bid manager for managing bids from management consoles, wherein the console bid manager is in communication with the management controller and configured to:
        intercept a system thermal event from a managed server;
        transmit a notification of the system thermal event to the management consoles for the bids to resolve the system thermal event by performing an action, wherein each one of the bids includes a cost to resolve the system thermal event, wherein the cost includes a central processing utilization for resolving the system thermal event, wherein the management consoles have subscribed to the console bid manager to receive the notification of the system thermal event;
        process bids from the management consoles to determine a bid with a lowest cost;
        delegate the performance of the action to a management console with the bid with the lowest cost; and
        if there is more than one management console with the lowest cost, then delegating the performance of the action based on ranking of the management console relative to the management consoles.

12. The information handling system of claim 11, wherein each one of the management consoles is configured with a feature to resolve the system thermal event.

13. The information handling system of claim 11, wherein the console bid manager is further configured to filter the system thermal event if there is no management console subscribed to the system thermal event.

14. The information handling system of claim 11, wherein the console bid manager is further configured to assign a score to each of the management consoles to determine an eligible management console to perform the action.

15. The information handling system of claim 11, wherein the console bid manager is further configured to generate a console subscription list based on received subscriptions from the management consoles.

16. A method comprising:
    intercepting, by a processor, a hardware operating system event triggered by a managed server, wherein the processor hosts a console bid manager for managing bids from management consoles to resolve the hardware operating system event triggered by the managed server, wherein each of the management consoles is associated with a management controller that manages the managed server;
    transmitting a notification of the hardware operating system event to the management consoles for the bids to resolve the hardware operating system event by performing an action, wherein each of the bids includes a cost to resolve the hardware operating system event, wherein the cost includes a central processing unit utilization for resolving the hardware operating system event, wherein the management consoles have subscribed to the console bid manager to receive the notification of the hardware operating system event;
    processing the bids received from the management consoles to determine a bid with a lowest cost;
    delegating performance of the action to the management console with the lowest cost; and
    if there is more than one management console with the lowest cost, then delegating the performance of the action based on ranking of the management console relative to the management consoles.

17. The method of claim 16, determining an interrelated action and coordinating performance of the interrelated action with the action.

18. The method of claim 16, determining a dependent action and coordinating performance of the dependent action.

19. The method of claim 16, further comprising filtering the hardware operating system event if there is no management console subscribed to the hardware operating system event.

20. The method of claim 16, further comprising assigning a score to each of the management consoles.

* * * * *